(12) United States Patent
Zamarron Pinilla et al.

(10) Patent No.: US 7,494,008 B2
(45) Date of Patent: Feb. 24, 2009

(54) CASE FOR DISC-TYPE OPTICAL RECORDING MEDIA

(75) Inventors: Alberto Zamarron Pinilla, Valladolid (ES); Abel Pedro Rodriguez Garcia, Valladolid (ES); Pedro Manuel Escolar Cuevas, Valladolid (ES); Pedro Garayo Olarra, Valladolid (ES)

(73) Assignee: Creta Creacion De Empresas Con Tecnologia Avanzada, S.L., Valladolid (ES)

( * ) Notice: Subject to any disclaimer, the term of this patent is extended or adjusted under 35 U.S.C. 154(b) by 650 days.

(21) Appl. No.: 10/527,532

(22) PCT Filed: Sep. 12, 2003

(86) PCT No.: PCT/ES03/00462

§ 371 (c)(1),
(2), (4) Date: Nov. 23, 2005

(87) PCT Pub. No.: WO2004/024599

PCT Pub. Date: Mar. 25, 2004

(65) Prior Publication Data

US 2006/0169606 A1    Aug. 3, 2006

(30) Foreign Application Priority Data

Sep. 12, 2002    (ES)    ................................ 200202092

(51) Int. Cl.
*B65D 85/57*    (2006.01)

(52) U.S. Cl. ...................................... 206/310; 206/493
(58) Field of Classification Search .............. 206/308.1, 206/310, 311, 312, 313, 493, 1.5, 555
See application file for complete search history.

(56) References Cited

U.S. PATENT DOCUMENTS

| | | | | |
|---|---|---|---|---|
| 5,845,771 A | * | 12/1998 | Fu | 206/308.1 |
| 6,283,284 B1 | * | 9/2001 | Crane et al. | 206/310 |
| 6,394,266 B1 | * | 5/2002 | Chou | 206/308.1 |
| 6,568,526 B1 | * | 5/2003 | Reinhardt et al. | 206/310 |

* cited by examiner

*Primary Examiner*—Jacob K Ackun, Jr.
(74) *Attorney, Agent, or Firm*—Ladas & Parry LLP

(57) ABSTRACT

Provided with a base body (1b), with its corresponding cover (1a) and the ridge (1c) which connects them, said base body (1b) contains inside it a lug (2) articulated to same at (2b) and connected at its other end (7), also by articulation, to the ridge (1c) of the case or to the cover (1a) so that said lug (3) is displaced towards the bottom (1b) and is separated from same, during the case closing and opening operations. The lug (2) incorporates the seating and fixing means for the disc, specifically a series of flexible pins (5) capped with retaining teeth (5a), which, when the lug (2) is raised, may be connected in the orifice of the disc, and which, when the said lug drops during the case closing operation, are projected outwards by a spindle (6) integral with the bottom (1b) of the case, causing locking of the disc.

16 Claims, 6 Drawing Sheets

CASE FOR DISC-TYPE OPTICAL RECORDING MEDIA

OBJECT OF THE INVENTION

This invention relates to a case which has been specially designed to house optical recording media in the form of a disc, such as compact discs (CD's), digital video discs (DVD's) and the like, which keeps said media or discs properly protected from the environmental agents that surround them.

The object of the invention is to provide a case which, whilst maintaining the disc perfectly secured it when said case is closed, causes it to be automatically released when it is opened without the need for any further operation in this respect.

BACKGROUND OF THE INVENTION

According to the State of the Art, cases for an optical recording medium in the form of a disc comprise in the central section of their base a projecting formation for connection purposes by adjusting the disc through its central opening, normally by means of retaining teeth or projections. The projecting formation is provided with deformable compression areas to enable the disc to be released from its retaining device by exerting pressure on said projection or simply by pulling the disc out by its peripheral area. Moreover, they are normally provided on the base with several circumferential projections that are located concentrically with the central projecting formation so that the outer edge of the disc is supported in them.

This projecting formation has a structure suitable for manufacture in processes in which are moulded the plastic materials which form the walls of the case so that they are integral with said walls.

The operation of releasing the disc, apart from being rather intuitive and inconvenient, results in the deformation of the disc, bending it radially, which in many cases is excessive and which may damage it, or at least generate in the disc a fatigue effect.

On the basis systems others were developed in which an attempt was made to facilitate removal of the disc, as well as in some way to ensure that the disc is "offered" or "approaches" the user. In this spirit systems were developed such as those described in U.S. Pat. No. 4,793,480, U.S. Pat. No. 5,573,120, U.S. Pat. No. 5,906,275 and U.S. Pat. No. 6,283,284, in which, by means of different mechanisms, the opening movement of the case which housed the disc was intended to make it easier for the user to remove same.

However, these mechanisms or systems suffer from a lack of simplicity whilst at the same time in some cases damaging the disc itself, both because of the unstable position of the disc and because of the pressure or friction exerted by the platform which raises it above the data area.

Moreover, the devices described in these documents suffer from other disadvantages no less significant, such as the fact that the disc is not "offered" to the user horizontally when the case is opened, which makes the operation of removing and retrieving the disc difficult. Furthermore, the mechanism of a process in which the cases are filled with discs is also made extremely difficult.

Another disadvantage of these systems is the large number of parts of which almost all of them comprise, in addition to the inclusion, in some of them, of the classic projecting formation or central rosette for connection by adjustment of the disc or other type of removal mechanism which the user must still actuate to release the disc once the case is open.

DESCRIPTION OF THE INVENTION

The case proposed by the invention solves the problem outlined above most satisfactorily in that, whilst ensuring perfect securing of the disc inside the case when it is closed, it enables the disc to be released automatically when the case is opened.

For this purpose a bridge lug is provided inside the case, which is connected at one of its ends by a hinge to the actual base of the case, and which is connected at the other end to the ridge or cover of same so that during the opening or closing operations said lug is displaced relative to the base of the case, specifically performing a departing movement during the opening operation, and an approach movement during the closing operation.

This lug incorporates, in a centred position, a core connecting to the central orifice of the disc, provided with flexible pins capped with retaining teeth for said disc, characterised in that said teeth tend to maintain a certain distance from the edge of the disc orifice, in a situation where the latter is released, and in that they only tilt outwards, towards a locking position, when, during the displacement of the lug towards the bottom of the case, in the closing position, stops provided on said bottom penetrate the core of the lug and force said teeth to tilt radially outwards, specifically towards the disc locking position.

It is therefore sufficient merely to place the disc on the lug, properly centred by means of supports provided in the latter, without the need to exert any direct pressure on the disc, and so that during the case closing operation the lug automatically drops to the bottom of said case, with the consequent and automatic activation of the disc locking elements, thus retaining the disc perfectly stabilised inside the case, whilst it is in turn maintained in its closing position. When the case is opened, this opening operation automatically causes the lug to rise, with the consequent automatic release of the disc locking mechanisms, so that the disc can be gripped manually and independently of the case, without the need for the slightest physical force.

Finally, another difference the invention is claimed to have in respect of other systems that are being developed according to the state of the art for similar purposes, is that the case can be manufactured in a single piece, which constitutes an obvious advantage.

DESCRIPTION OF THE DRAWINGS

To supplement the description being given, and for a clearer understanding of the characteristics of the invention, according to a preferred embodiment of the same, a set of drawings is attached as an integral part of said description, in which the following is shown by way of non-exhaustive illustration.

Finally.

PREFERRED EMBODIMENT OF THE INVENTION

Figure 1:
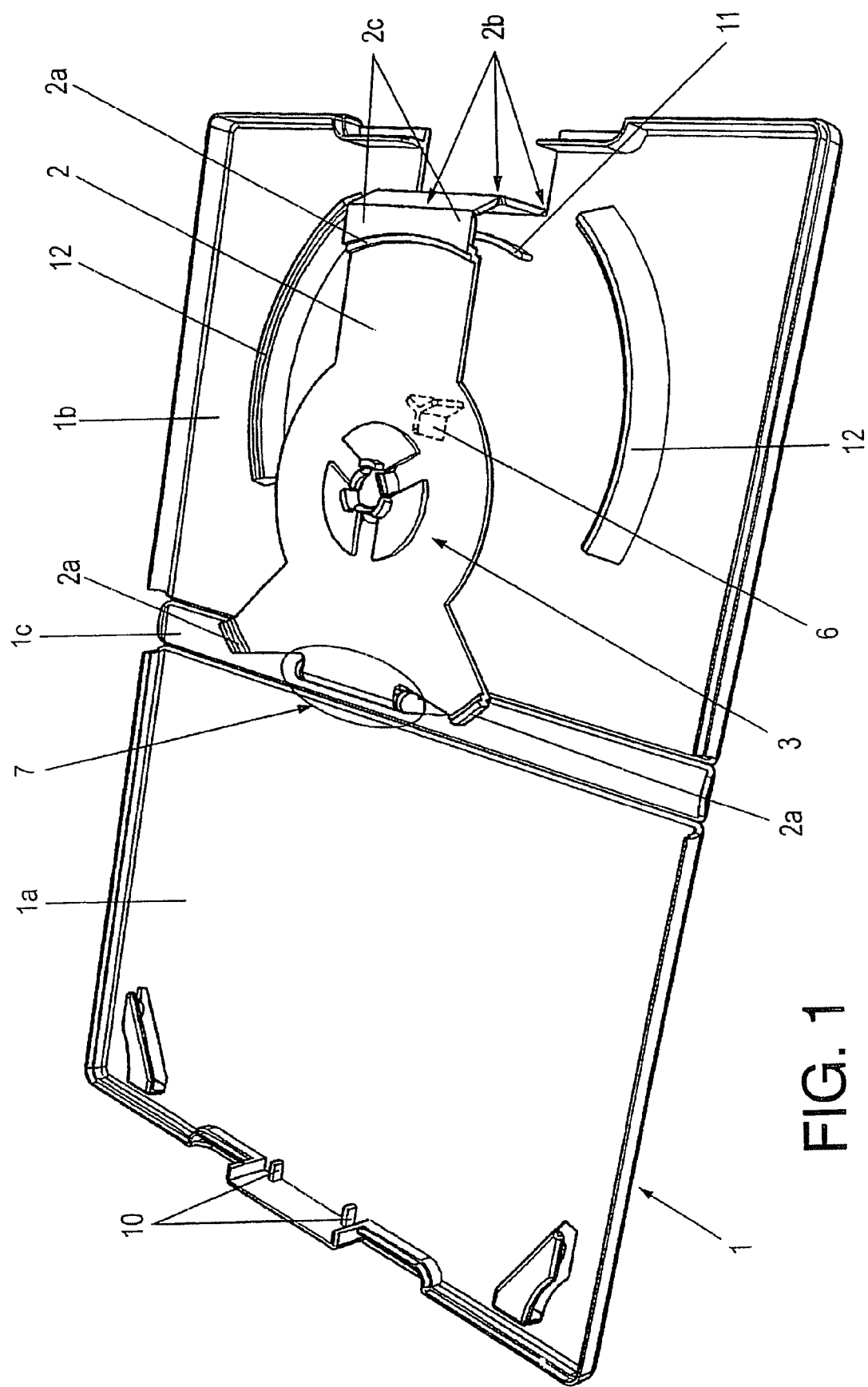
FIG. 1 shows a perspective view of a case for optical recording media in the form of a disc, produced with the object of this invention, which is shown in the opening position.
Figure 2:
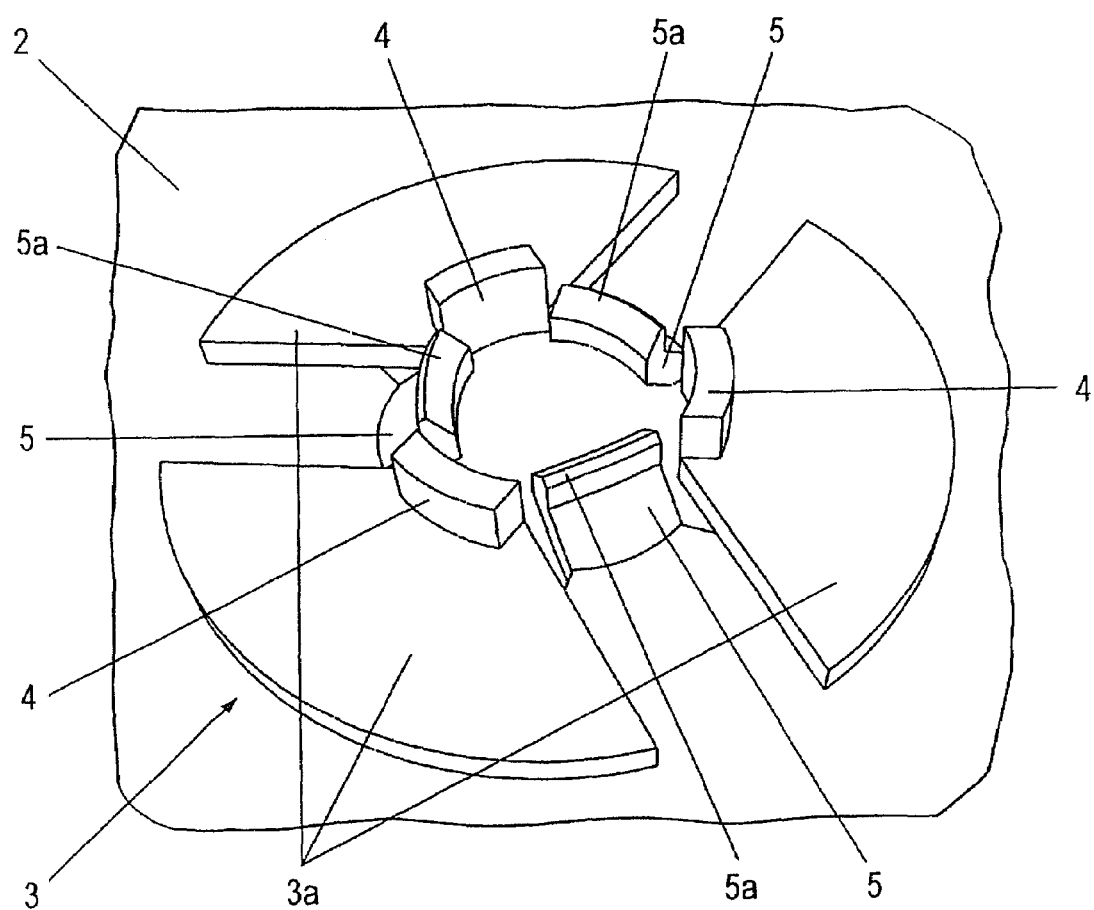
FIG. 2 shows an enlarged detail, also in a perspective view, of the central area of the lug forming part of the case, in the same opening position of same.
Figure 3:
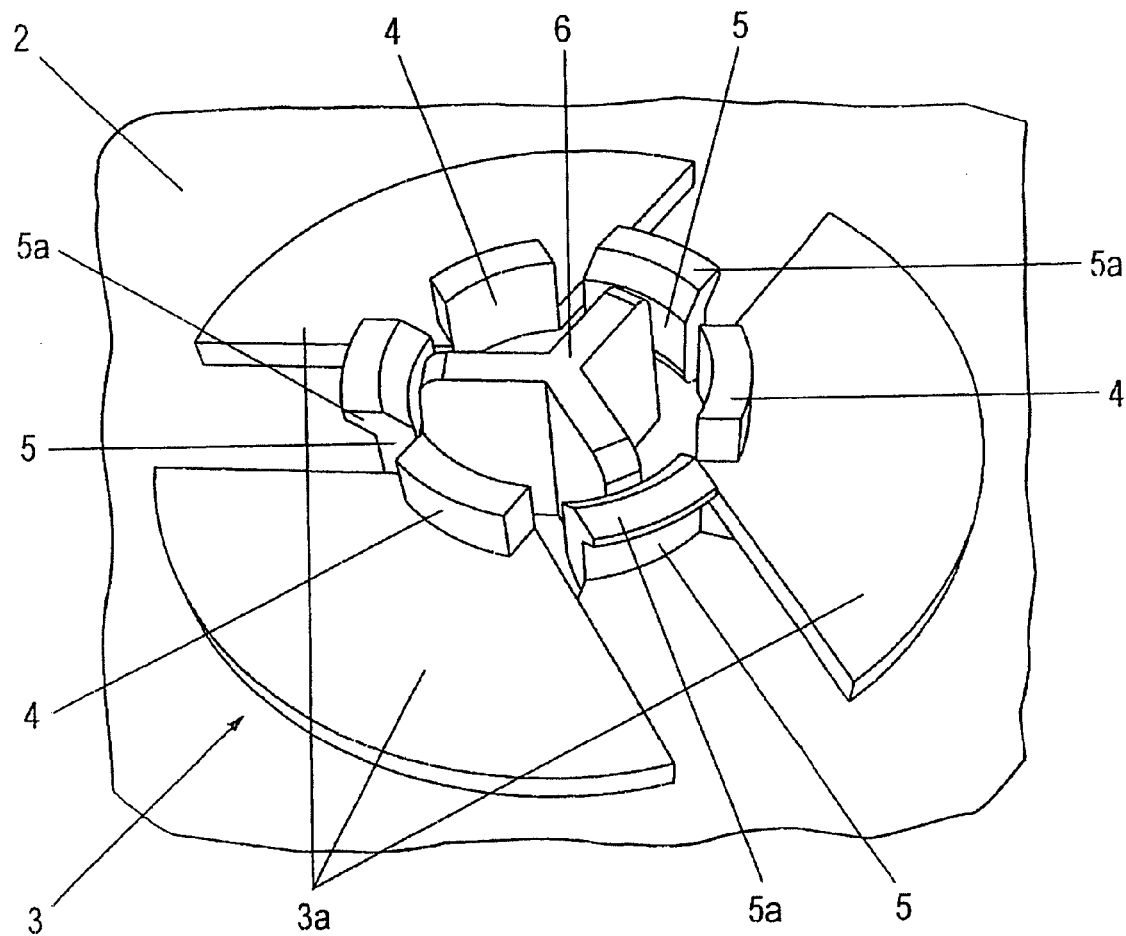
FIG. 3 shows a similar detail to the previous figure, but here the disc locking mechanisms have been activated by the dropping of the lug during the actual case closing operation.
Figure 4:
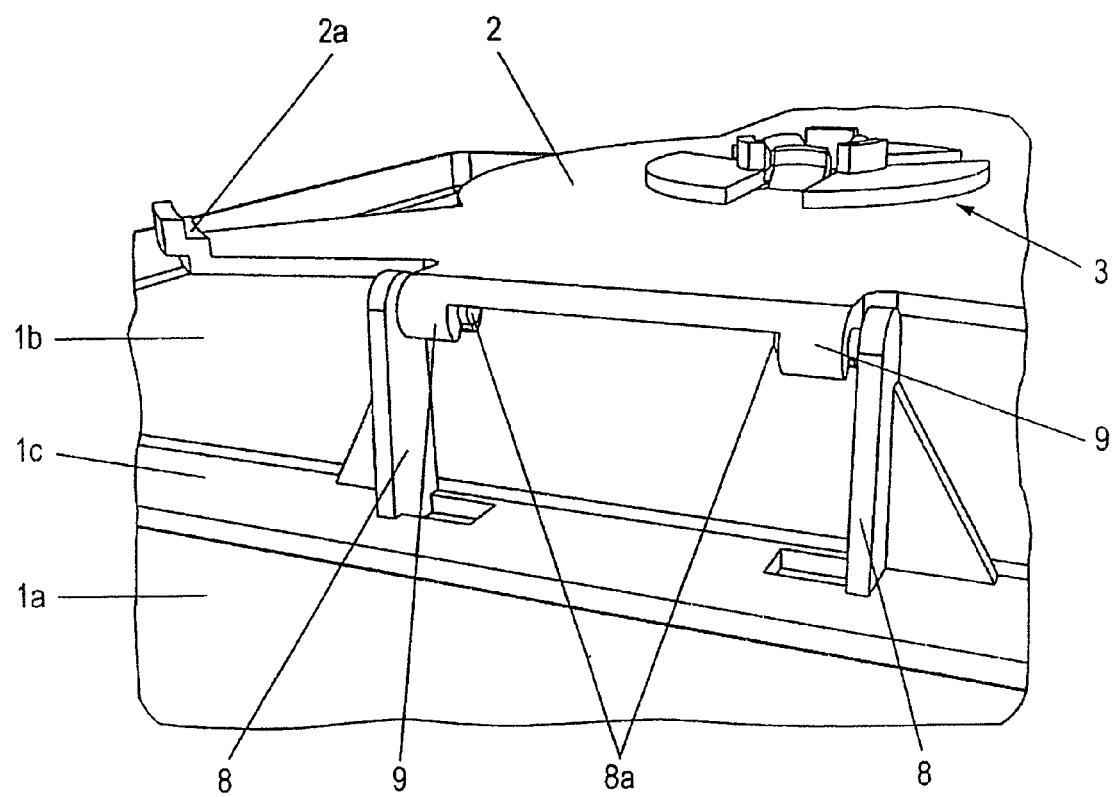
FIG. 4 shows a perspective detail of the area in which the lug is hinged to the ridge of the case.
Figure 5:
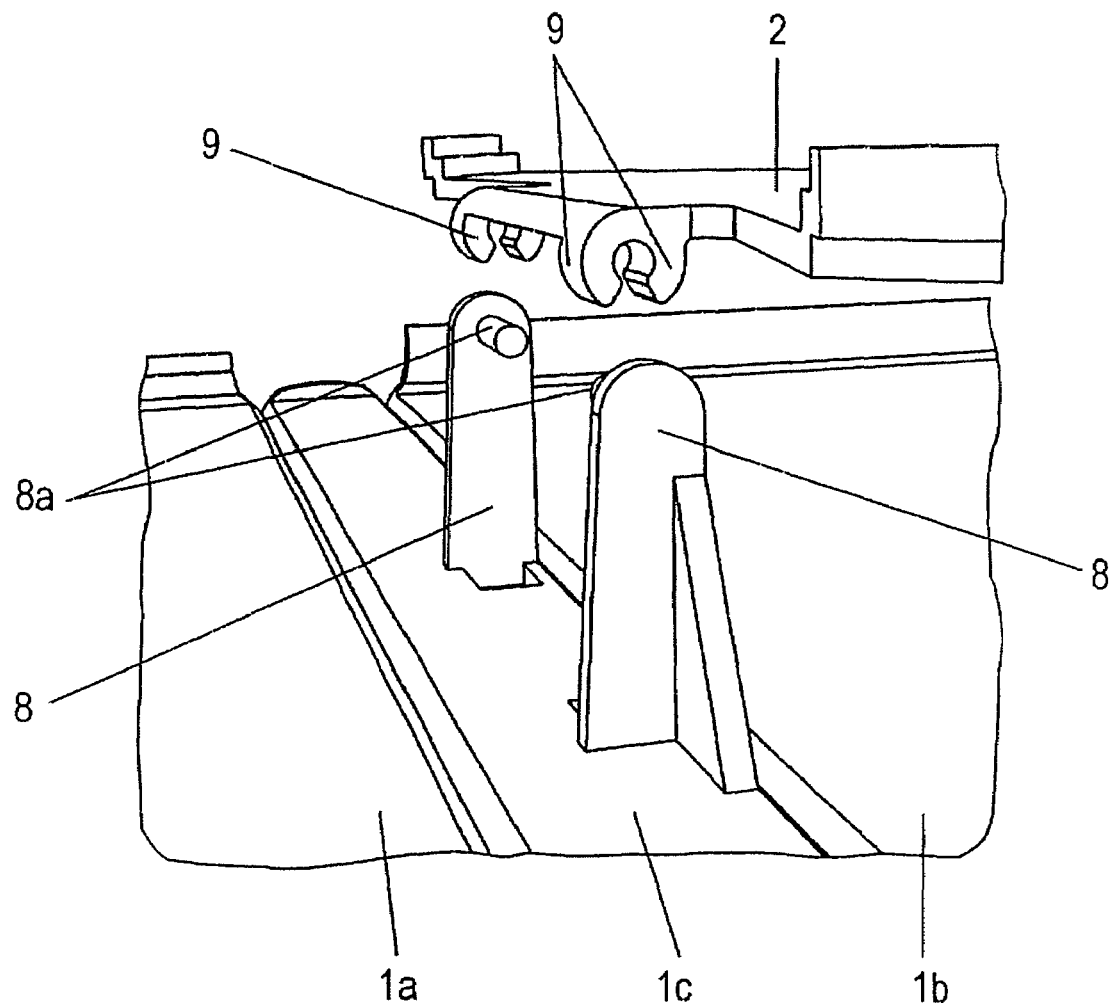
FIG. 5 shows another perspective view of the detail in the previous figure, with the lug disconnected.
Figure 6:
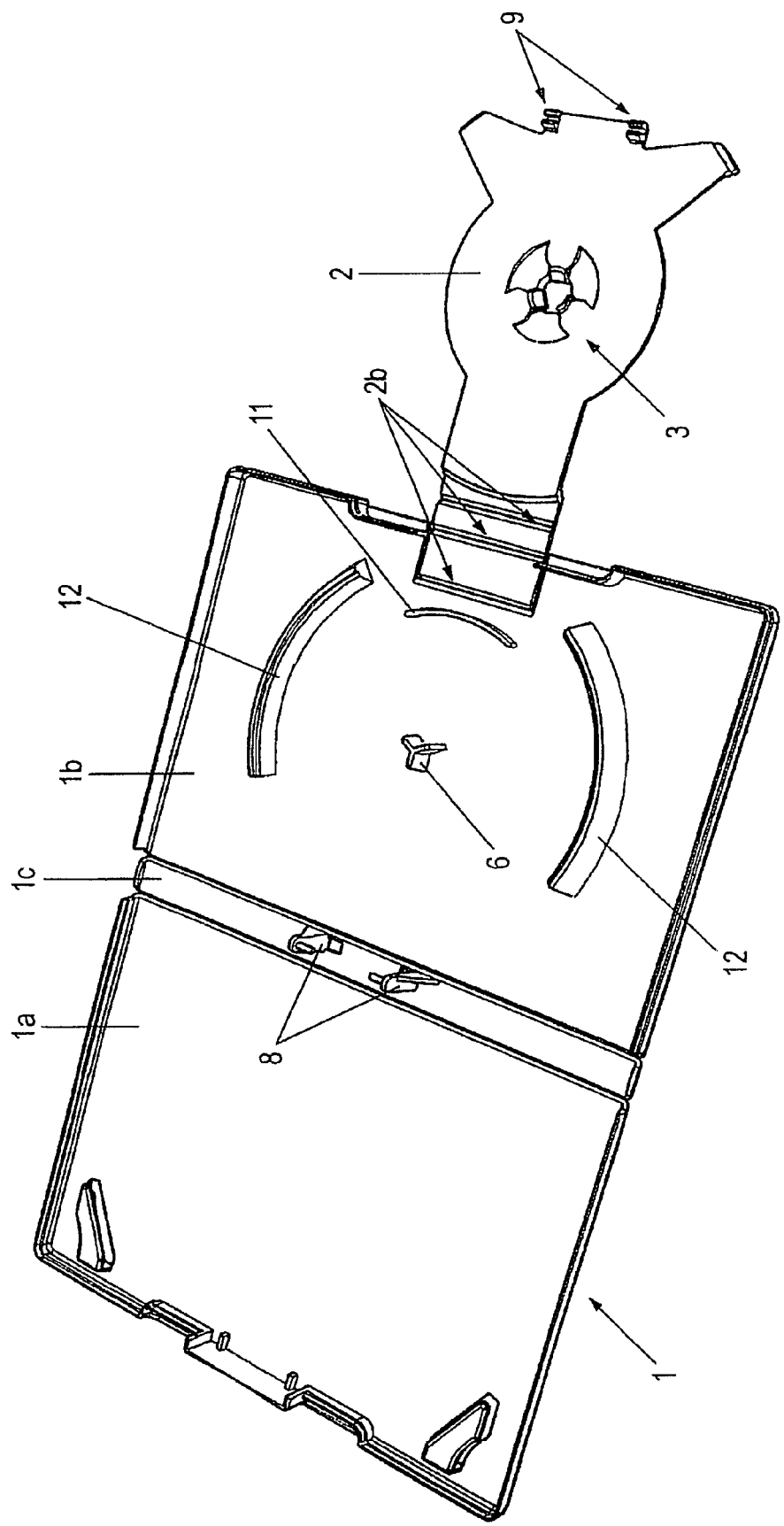
FIG. 6 shows a representation similar to that shown in FIG. 1, but here said lug is also shown to be disconnected from the ridge of the case, as an extension of the later, in the position obtained after the corresponding injection process.

An examination of the figures described reveals how the case (1), proposed by the invention, incorporates as a fixing means for the disc concerned, an articulated moving lug (2) provided with the projections (2a) for supporting the periphery of the disc and the device (3) for centrally retaining the disc. This lug has three hinges (2b), one of which connects it to the base of the case. At its opposing end the lug is connected to the ridge of the case by means of a shaft-hole system (7) comprising two horizontal cylindrical shafts (8a) which project from the projections (8) which extent orthogonally upwards from the inner face of the ridge when the case is open, and two horizontal cylindrical holes in the lug. These holes are each formed by two projections (9) in the form of claws, which are elastically deformable so that they can be opened and allow the cylindrical projections on part of the ridge to engage in each other. This form of connection enables the lug to rotate relative to the ridge in said connection. When the case is opened the ridge rotates relative to its hinge connecting it to the case, and causes the lug (2) to rise as it is pulled from the base, which in turn causes it to be articulated by its three hinges.

A second design for ensuring that the lug is raised during the opening of the case involves connecting the end of the lug to the inner face of the cover, instead of connecting it to the ridge. This design is the same as that described above, with the same shaft-hole system, but in this case the projections (8) extend orthogonally upwards from the inner face of the cover in the totally open position of the case.

A variation on the two designs described involves placing in the lug elements which act as a shaft and elements which act as a whole in the projections of the ridge or cover.

The device (3) for central retention of the disc, which carries the lug (2), consists of a cylindrical platform (3a) in which rests the inner surface of the central crown of the disc. This platform is provided with a hole in its centre around which are arranged three spindles (4), which act as centring mechanisms for the disc when they engage in the central opening of the disc. Three flexible pins (5), with retaining teeth (5a), are wedged in between these mechanisms. In the position of rest these pins are inclined towards the centre of the central hole in the lug platform at an angle of at least 45°, so that the retaining teeth (5a) with which they are provided on their outside do not come into contact with the disc. These three pins retain the disc against the platform (3a) of the lug by opening outwards due to elastic deformation when the case is closed and lowers the lug, causing the spindle (6), formed in the base, to pass through the hole in the lug, pushing the pins upwards and outwards. Whilst the case is closed the pins (5) are therefore deformed and are forced by the spindle (6) to retain the disc against the lug by means of their retaining teeth.

The spindle (6) is formed by three walls perpendicular the base, which walls come into contact in their top section with the flexible pins (5). The general shape of the spindle is slightly conical, widening towards the base.

To ensure that the lug is lowered to the desired horizontal position in which the pins have fully opened, the cover of the case is provided with several projections (1) on the inner face which push the lug downwards through the area (2c) close to the hinges (2b) when the case is closed. Similarly, to prevent the lug from lowering the base excessively, it is provided with a projection (11) on the inner face which acts as a stop.

The base (1b) is also provided with several circumferential projections (12) which support the edge of the disc when the case is closed, ensuing that moist of the periphery of the disc is supported in the closed position of the case.

The preferred embodiment of the invention will be achieved by injecting sufficiently flexible plastic material, integral with the lug, without connecting it to the ridge or to the cover, and fully lowered. The lug is connected by its shaft-hole system in a subsequent folding and clipping operation. The geometry of the product facilitates the application of these processes in manufacture.

According to this structuring, and based on the position of the case shown in FIG. 1, the disc may easily be placed on the lug (2), properly centred by the projections (2a), the flexible pins (5) freely penetrating inside it, inasmuch as the retaining teeth (5a) are located in a position that is essentially upwardly and inwardly inclined. In this situation, the mere tilting of the cover (1a) towards the closing position gives rise to a downward displacement of the lug (2a), simultaneously with a transverse displacement of the same, which causes the spindle (6) to penetrate the opening formed by the centring spindles (4), forcing the flexible pins (5) to undergo radial outward deformation. This causes the teeth (5a) to lock the disc through its central orifice, the disc being perfectly immobilised inside the case as long as it is not opened again.

The invention claimed is:

1. Case for optical recording media in the form of a disc, specifically for media such as compact discs (CD's), digital video discs (DVD's) and the like, in which is established a base or bottom wall and a cover, interconnected by articulation by means of an intermediate ridge, characterised in that the inside same is established a lug (2), parallel with its bottom wall (1b) and displaceable relative to the latter during the opening and closing operations of the case, which lug (2) defines a platform (3) for supporting the disc and is provided with fixing means (5-5a) for same, which means are activated and deactivated automatically during the opening and closing operation of the case.

2. Case for optical recording media in the form of a disc, according to claim 1, characterised in that the lug (2) is connected integrally to the bottom (1b) of the case, with which it is connected by means of a triple line of hinges (2b), whilst at the same time said lug (2) is connected at its opposite end to the ridge (1c) or cover (1a) of the case by means of small horizontal, coaxial cylinders (8a) emerging from the respective projections (8) and capable of connection by pressure in projections (9), in the form of claws provided at the corresponding end of the lug (2).

3. Case for optical recording media in the form of a disc, according to claim 1, characterised in that the lug (2) incorporates centring projections (2a) for correct positioning of the disc on it, with its central orifice facing the retaining means (4-5-5a) provided for said disc.

4. Case for optical recording media in the form of a disc, according to claim 1, characterised in that the retaining means for the disc, provided in the lug (2), consist of centring spindles (4), arranged alternately with flexible pins (5) capped with retaining teeth (5a), which tend to be kept retracted relative to the spindles (4), and which project outwards to lock the disc through its orifice by means of a spindle (6) which emerges rigidly from the bottom (1b) of the case, and which is inserted between the flexible pins (5) when the lug (2) is displaced downwards during the case closing operation.

5. Case for optical recording media in the form of a disc, according claim 1, characterised in that its manufacture by moulding is carried out in a single piece.

6. Case for optical recording media in the form of a disc, according to claim 2, characterised in that the lug (2) incorporates centring projections (2a) for correct positioning of the disc on it, with its central orifice facing the retaining means (4-5-5a) provided for said disc.

7. Case for optical recording media in the form of a disc, according to claim 2, characterised in that the retaining means for the disc, provided in the lug (2), consist of centring spindles (4), arranged alternately with flexible pins (5) capped with retaining teeth (5a), which tend to be kept retracted relative to the spindles (4), and which project outwards to lock the disc through its orifice by means of a spindle (6) which emerges rigidly from the bottom (1b) of the case, and which is inserted between the flexible pins (5) when the lug (2) is displaced downwards during the case closing operation.

8. Case for optical recording media in the form of a disc, according to claim 3, characterised in that the retaining means for the disc, provided in the lug (2), consist of centring spindles (4), arranged alternately with flexible pins (5) capped with retaining teeth (5a), which tend to be kept retracted relative to the spindles (4), and which project outwards to lock the disc through its orifice by means of a spindle (6) which emerges rigidly from the bottom (1b) of the case, and which is inserted between the flexible pins (5) when the lug (2) is displaced downwards during the case closing operation.

9. Case for optical recording media in the form of a disc, according to claim 6, characterised in that the retaining means for the disc, provided in the lug (2), consist of centring spindles (4), arranged alternately with flexible pins (5) capped with retaining teeth (5a), which tend to be kept retracted relative to the spindles (4), and which project outwards to lock the disc through its orifice by means of a spindle (6) which emerges rigidly from the bottom (1b) of the case, and which is inserted between the flexible pins (5) when the lug (2) is displaced downwards during the case closing operation.

10. Case for optical recording media in the form of a disc, according to claim 2, characterised in that its manufacture by moulding is carried out in a single piece.

11. Case for optical recording media in the form of a disc, according to claim 3, characterised in that its manufacture by moulding is carried out in a single piece.

12. Case for optical recording media in the form of a disc, according to claim 4, characterised in that its manufacture by moulding is carried out in a single piece.

13. Case for optical recording media in the form of a disc, according to claim 6, characterised in that its manufacture by moulding is carried out in a single piece.

14. Case for optical recording media in the form of a disc, according to claim 7, characterised in that its manufacture by moulding is carried out in a single piece.

15. Case for optical recording media in the form of a disc, according to claim 8, characterised in that its manufacture by moulding is carried out in a single piece.

16. Case for optical recording media in the form of a disc, according to claim 9, characterised in that its manufacture by moulding is carried out in a single piece.

\* \* \* \* \*